United States Patent Office 2,798,759
Patented July 9, 1957

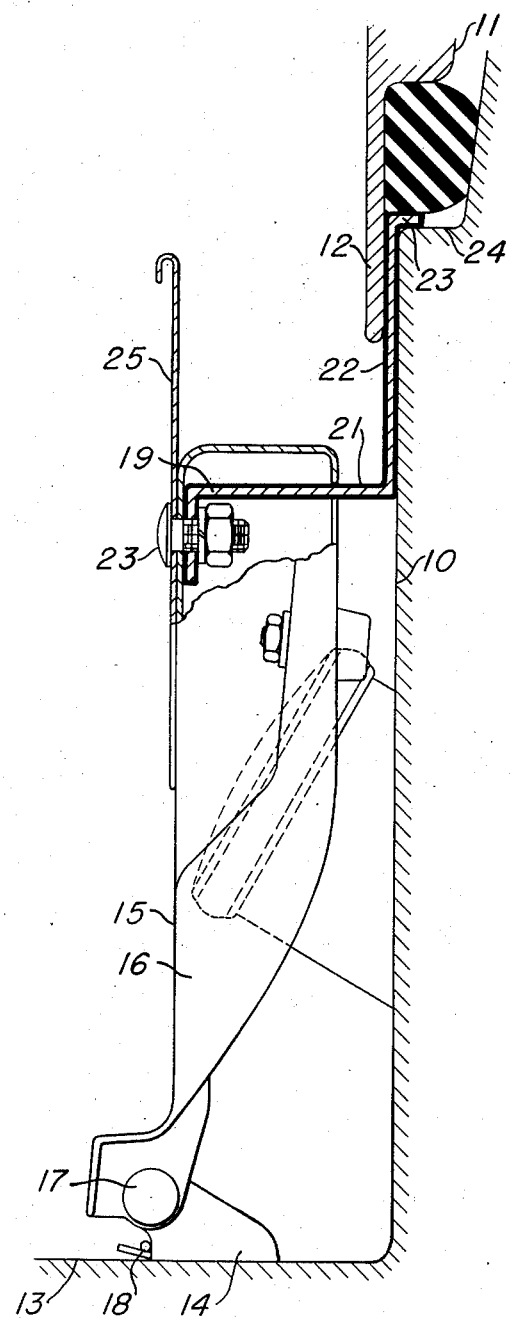

2,798,759

NUMBER PLATE BRACKET AND FILLER CAP LOCK

Charles Frederick and George E. Chaloux, Arlington, Mass.

Application June 6, 1955, Serial No. 513,272

2 Claims. (Cl. 296—1)

Recently the gasoline filler cap of many new motor vehicles has been moved from its former position on the rear fender to a central location beneath the trunk door opening. This position eliminates the spouting of fuel, which air lock in a long filler tube caused, and gives more useful space in the trunk. However, the state registration number plate of the vehicle must be displayed in approximately this same central position. As a consequence, the number plate is now carried on a hinged bracket, which can be swung downwards when the tank is to be filled and exposes the filler pipe and cap which lie directly behind it.

In most of the newer number plate brackets, the lower hinge leaf is fastened to the rear body apron while the upper leaf, which forms the actual support for the number plate, is deeply skirted and is spring urged to maintain the number plate in an erect position. When the number plate is erect, the end of the filler pipe and its cap lie behind the upper hinge leaf and inside of its deep skirt. The hinge springs sometimes rust and snap, in which case the number plate falls from its legal position, and sometimes road shock alone throws the plate downwards.

We have found that, by attaching a plate to the back of the movable leaf of such a hinged bracket and shaping the projecting portion of the plate so that a part of it lies against the trunk skirt of the motor vehicle and a further portion projects into the jamb area of its trunk door, not only is it then impossible for the number plate bracket to fall down but the device automatically becomes a fuel tank lock, for it is impossible to gain access to the filler cap and fuel tank whenever the trunk is locked.

In the drawing, which shows our combination in elevation and partial section, parts of the motor car body have been represented in a generalized manner. The bracket shown is that used on several current Ford models. It too is intended to be a generalized representation, since various makers' styles require certain bracket adaptations.

The line 10 indicates the position of the lower back wall of a motor car body. Line 11 indicates the trunk door, 12 indicates the door flange along the bottom margin of the door, and 13 indicates the rear body apron of the vehicle. The lower leaf 14 of the hinge bracket 15 is fastened to the body apron 13. The upper leaf 16 is hinged on the hinge pin 17 and is urged upwardly by the spring 18. The bracket locking and supporting member 19 consists of a bent plate having two angularly disposed arms 21 and 22. Arm 21 is rigidly attached to the upper hinge leaf 16 in any suitable manner, as by spot welding or, for example, by the carriage bolt 23, which is commonly provided to hold the adjustable number plate top brace hook 25. Arm 21 projects forwardly of the vehicle a distance which substantially equals the distance between the normal position of the bracket and the lower back wall of the car body. At this point it merges into arm 22, which lies substantially against the car body. The end of arm 22 may be bent, as at 23', to project into the jamb 24 of the car trunk door, but this last, although it makes the bracket lock more rigid, is not necessary. It will be noted that, when the bracket is erect and the trunk door is closed, arm 22 lies between the car body 10 and the door rim 12. Accordingly, whenever the trunk is locked, it is impossible to lower the bracket 15 and gain access to the filler cap, which lies behind it; and at all times when the trunk door is latched, the bracket is held in proper position, since arm 22 is rigidly maintained between the car body and the trunk door rim. To protect paint, the arm may be jacketed with neoprene or some other material which is not injured by spilled gasoline.

The simplicity and ready adaptability of our device to varying designs of brackets and car models has led to its immediate acceptance.

We claim:

1. In combination with a hinged vehicle plate bracket, having at its upper free end bolt means for securing a number plate brace hook thereto, an angularly bent plate having an intermediate substantially horizontal portion and two oppositely directed arms extending generally vertical thereto, the downwardly extending arm being perforated for attachment to said bolt means, the upwardly extending arm being adapted to lie substantially flush against the lower rear wall of the motor vehicle body and to be overlapped by the trunk door of said vehicle when the number plate is erect and the door is closed whereby the bracket is rigidly held erect when the trunk door is closed.

2. Locking means as claimed in claim 1 wherein the terminal portion of the upwardly extending arm is bent to permit its entry into the door recess of the motor vehicle and is also overlapped by said trunk door when the number plate is erect and the door is closed.

References Cited in the file of this patent

UNITED STATES PATENTS

| | | |
|---|---|---|
| 2,708,594 | MacPherson | May 17, 1955 |
| 2,729,500 | Dickenshied et al. | Jan. 3, 1956 |